United States Patent
Grimm

[15] 3,698,844
[45] Oct. 17, 1972

[54] AUTOMATIC TEMPERATURE CONTROL SYSTEM FOR EXTRUDERS FOR MOLTEN MATERIAL

[72] Inventor: Peter Grimm, Bergen-Enkheim, Germany

[73] Assignee: Metallgesellschaft Aktiengesellschaft, Frankfurt am Main, Germany

[22] Filed: July 24, 1970

[21] Appl. No.: 58,010

[30] Foreign Application Priority Data

Aug. 1, 1969    Germany..........P 19 39 248.4

[52] U.S. Cl. ............425/144, 264/40, 425/170, 425/378
[51] Int. Cl. .............................................B29f 1/00
[58] Field of Search.......18/12 SJ, 30 CM, 30 HB, 30 HM, 18/2 HA; 264/40; 219/502, 388, 499

[56] References Cited

UNITED STATES PATENTS

| | | | |
|---|---|---|---|
| 2,761,052 | 8/1956 | Knudsen | 219/499 |
| 2,892,916 | 6/1959 | Holmes | 219/499 X |
| 3,231,714 | 1/1966 | Oram et al. | 219/499 X |
| 3,032,822 | 5/1962 | Maddock | 18/1 HA UX |
| 2,760,046 | 8/1956 | Rothacker | 18/12 SJ X |
| 2,832,879 | 4/1958 | Van Riper | 18/12 SJ X |
| 2,820,132 | 1/1958 | Krause | 18/12 SJ UX |

FOREIGN PATENTS OR APPLICATIONS

| | | | |
|---|---|---|---|
| 552,939 | 4/1943 | Great Britain | 18/30 CM |
| 1,056,593 | 1/1967 | Great Britain | 18/12 SJ |

Primary Examiner—J. Spencer Overholser
Assistant Examiner—Michael O. Sutton
Attorney—Burgess, Dinklage & Sprung

[57] ABSTRACT

Automatic temperature control system for extruders having a plurality of heating zones which includes an electronic controller for controlling the electric heating power supplied to each zone, a temperature sensing device adapted to supply a signal to the controller representing the temperature of molten metal at the extruder head. The controller is in communication with all the heating zones and is adapted to control thyristor-type active networks associated with the respective heating zones which regulate the electric heating power supplied to each zone in a pre-set adjusted ratio.

3 Claims, 4 Drawing Figures

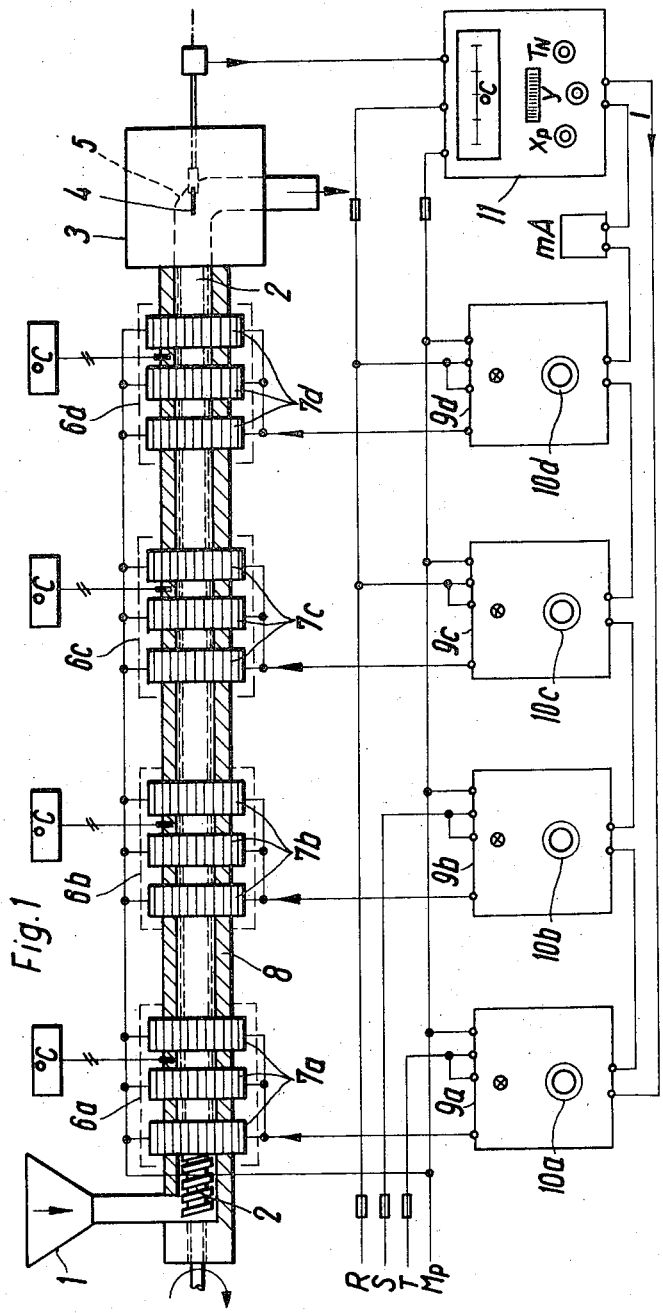
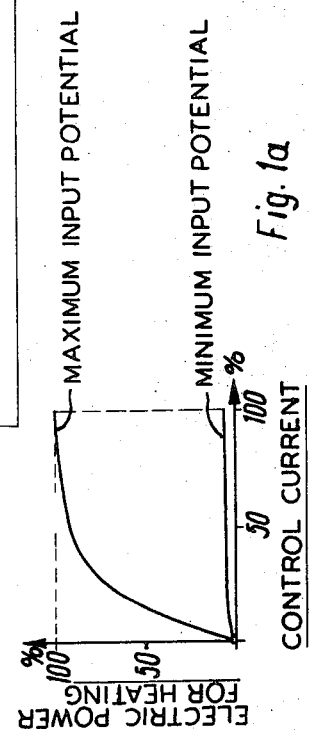

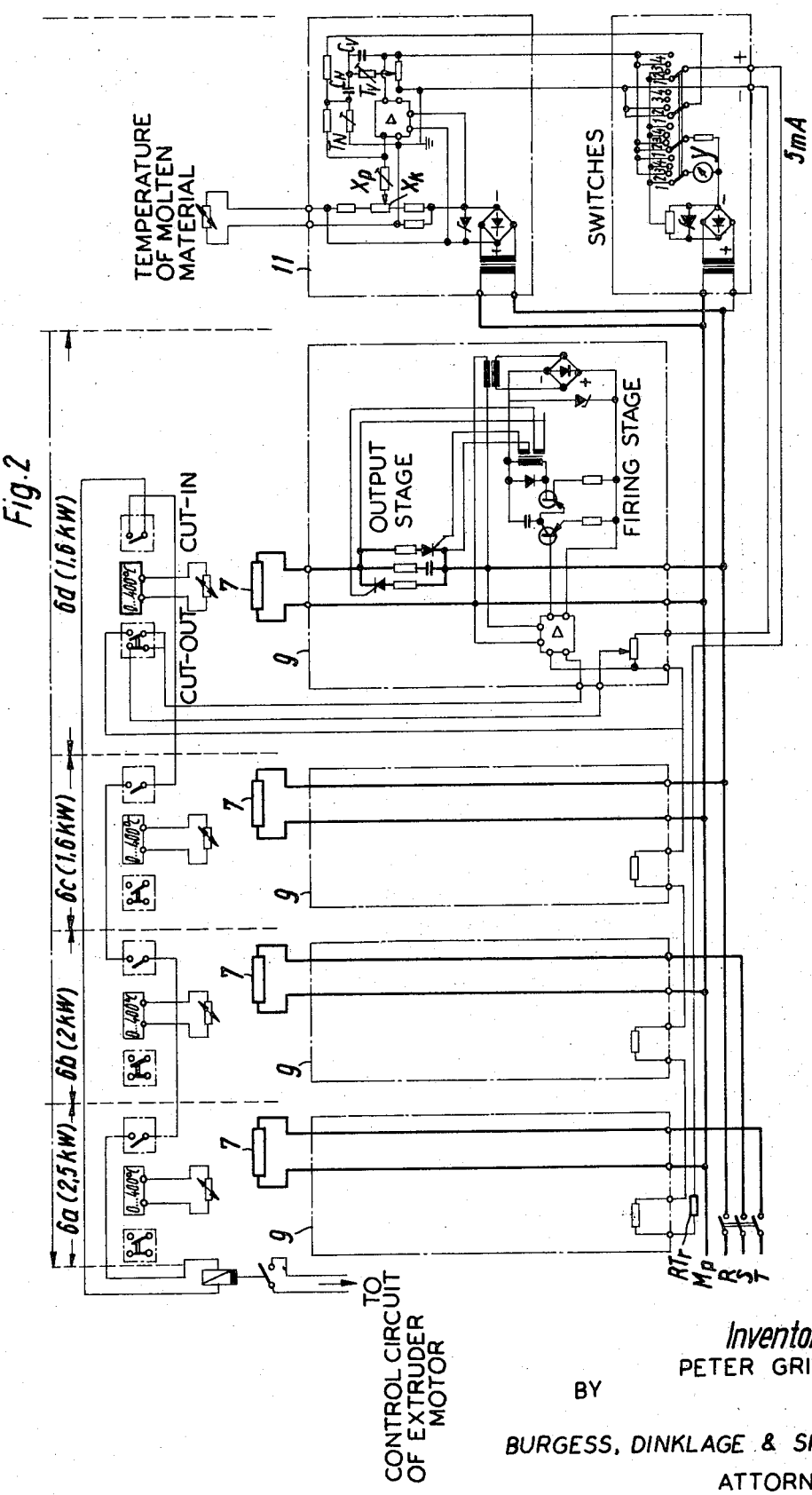

3,698,844

AUTOMATIC TEMPERATURE CONTROL SYSTEM FOR EXTRUDERS FOR MOLTEN MATERIAL

BACKGROUND pp This invention relates to an automatic temperature control system polytropic process extruders for molten material. Such extruders have several heating zones differing in heat requirement and the control system comprises an electronic controller controlled by a temperature sensor which in turn controls the electric heating power supplied to each zone.

In polytropic process extruders, the thermoplastic material is initially solid in the form of granules or chips and must be heated to leave the extruder head of the extruder as a homogeneous molten material and is then cooled and processed to form shapes, sections, tubes, cable sheaths, rods or filaments.

Unless the temperatures along the extruder are exactly in accordance with the properties of the material and of the extruder, such as the type of the feed screw, the speed, the depth of thread etc., the starting products will not be uniform and will form bubbles or blisters as a result of local overheating or may decompose as a result of excessive temperatures. Moreover, the temperature at the outlet of the extruder should not change with time.

To transform the plastics material from solid granules into a plastic and then into a molten state, the material is heated in the externally heated portion of the extruder barrel and also at the head or outlet of the extruder. For processing of some materials, it is necessary to also heat a hollow feed screw by a circulating heating fluid. The material being fed is thoroughly kneaded and mixed in the space between the cylinder wall and the screw channels of the extruder screw. The resulting frictional heat reduces the quantity of heat which is to be applied from the outside to melt the material and even cooling may be required in some cases.

Hence, the power which will meet the local heat requirement varies along the extruder. For this reason, the external heating of the extruder barrel has been carried out in a plurality of heating zones, which are separately controlled. Ideally, the molten material is discharged at a temperature at which the material is sufficiently plastic for a satisfactory further processing without exceeding temperatures which would cause a deterioration. In the past, the temperature of the molten material has been sensed with temperature sensors positioned in the shell of the extruder barrel rather than in the plastics material itself. However, the temperature sensed in this manner is not the true temperature of the plastic material and is considered only as a relative value.

It is known to heat the several heating zones of an extruder externally in the barrel with steam, saturated steam, or with circulating liquids, such as special heating oils. Only relatively few heating oils are available for temperatures above 200°C., such as diphenylchloride; diphenyloxide for temperatures up to 300°C., diphenyl and naphthaline for temperatures up to 350°C., and tetracresyl silicate for temperatures up to 400°C. Some of these oils produce fumes and are annoying and dangerous to the operators. In some cases, induction heaters which have a large space requirement are used.

The most widely used system for heating an extruder in separate zones comprises resistance heating elements in direct contact with the surface to be heated. The heating elements in most cases are in the form of narrow ribbons or consist of helicals, individuals rings, heating sleeves or heating cartridges. Such heating elements may be used to provide cirtually any desired temperature and they can easily be controlled by a control of the electric power supplied thereto. These resistance elements have the disadvantage that the temperature is sensed at the heated shell of the extruder barrel rather than in the molten material itself.

The temperature of the several heating zones may be controlled in various ways. For instance, a variable transformer may be manually controlled to change the heat output until a temperature sensor provided in the wall of the extruder indicates that the temperature which is desired at this location has been reached. Such a control will obviously depend to a high degree on the reliability of the operator and is not responsive to sudden changes in throughput or peak temperatures.

A constant temperature in the bulk of the material may also be maintained by an on-off control, e.g., by means of a thermostat. The on-off operation results in most cases in substantial temperature fluctuations until an equilibrium has been attained.

The most expensive system is one for a fully automatic proportional control, which enables a highly exact control of the temperature but is costly because it is highly sensitive and is somewhat liable to be deranged, particularly if a plurality of heating zones are to be controlled. Such a system requires a separate controller for each zone and the control actions in adjacent zones may influence each other.

SUMMARY

It is an object of the invention to avoid the above-mentioned disadvantages of a manual or thermostatic control and to reduce the expenditure which is required for a fully automatic control of each heating zone.

This object is accomplished in that a signal representing the temperature of the molten material at the extruder head is supplied by a temperature sensor which extends into the molten material, to a continuous electronic controller which is in communication with all heating zones and controls thyristor-type active networks associated with the respective heating zones which regulate the electric heating power supplied to each zone in a pre-set, adjusted ratio.

THE DRAWINGS

FIGS. 1 and 1a are diagrammatic views representing the automatic control system for an extruder.

FIG. 2 shows a thyristor-type active network.

DESCRIPTION

Figure 3:
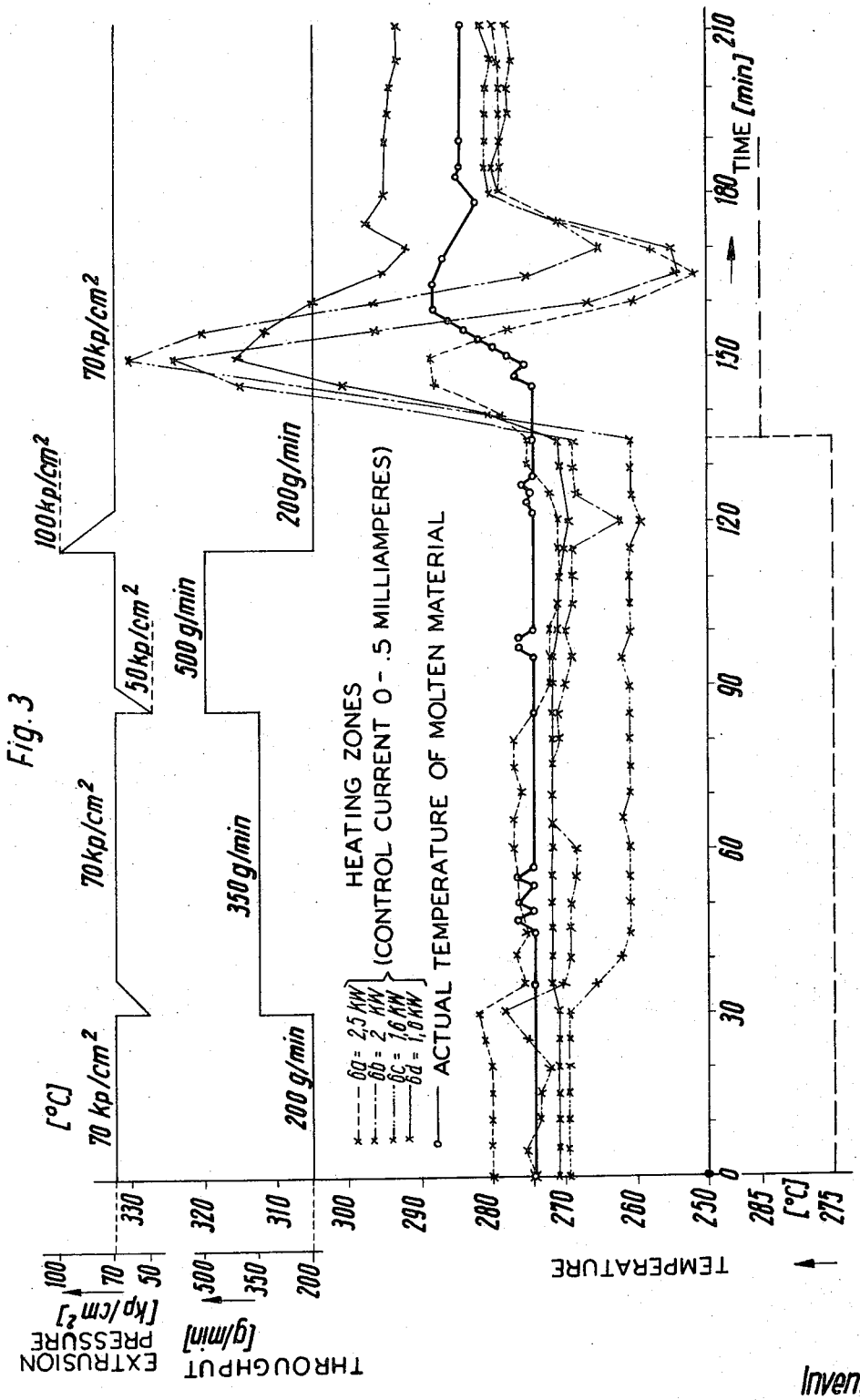
FIG. 3 is a diagram representing the automatic control operation of the system shown in FIG. 1.

The automatic control is performed continuously and without an operation of contacts. Uniform voltages which correspond to the actual power requirements (which are generally must below the nominal voltage) are applied by the thyristor-type active networks to the heating ribbons so that the life of the heating elements is increased. The input signal of the temperature controller represents the true temperature of the molten material and this temperature is sensed in the extruder head of the extruder directly in the molten material.

Because the power requirements of the several heating zones vary greatly and amount, e.g., to 2.5 kw at the receiving end of the extruder, 2 kw in the next following zone, 1.6 kw in the next following zone, etc., each thyristor-type active network may be provided with a potentiometer so that each zone will be supplied with the required power in response to a given output signal of the controller.

Referring to FIG. 1, an extruder screw (feed screw) 2 receives thermoplastic material from a feed hopper 1 and feeds the material to an extruder head 3. A temperature sensor 4 extends into the molten thermoplastic material in the bend 5 of a diphenyl-heated extruder head 3. The material travels from the feed hopper 1 to the outlet through, e.g., four separate heating zones 6a–6d, which are provided with heating elements 7a–7d respectively, which are mounted directly on an extruder barrel 8. Groups of three heating elements are connected together and form the respective heating zones 6a–6d. The power supplied to each heating zone is automatically controlled by thyristor-type active networks 9a–9d, which are controlled in turn by an electronic servocontroller 11 and input potentiometers 10a–10d. The controller 11 receives an input signal from the temperature sensor 4 and by means of a bridge circuit compares the sensed temperature and the desired temperature (melting temperature) and in response to that comparison supplies an output current, e.g., in the range of 0–5 milliamperes ($mA$). Depending on the setting of the potentiometers 10a–10d, the output current results in a voltage drop at each potentiometer, which controls the thyristor-type active networks 9a–9d so that they supply the required power to each zone 6a–6d. A change of the output current results in a change of the voltage across each of the potentiometers 10a–10d so that the electric power will be changed in all zones in the same proportion.

In accordance with FIG. 2, the electronic servocontroller 11 consists of a continuously operating PID or PI controller, which may be connected to thermocouples or resistance thermometers, as well as to thermistors. The primary control element (resistance thermometer, thermocouple or thermistor) is included in a bridge circuit, which is provided at the input of the controller. If the temperature measured by the sensor differs from the desired temperature, which is set at the control point setting potentiometer $Xk$, the voltage appearing across the output diagonal of the bridge will corespond to the error. This voltage which is proportional to the error is applied to a d.c. amplifier by the variable resistor $Xp$, which serves to vary the proportional range. The d.c., amplifier consists, e.g., of a diode modulator and an output amplifier. The trimming resistor $R_{Tr}$ serves to adjust the output current of the output amplifier to the requirements of the thyristor-type active network. The variable resistor $Xp$ permits of a change of the proportional range within wide limits. The variable resistor $T_N$ serves to adjust the lag of the resistance-capacitance series circuit $T_N$–$C_N$ used for compensation.

The rate time is adjusted by means of the resistance-capacitance series circuit $T_V$–$C_V$.

Thyristor-type active networks (a.c. active networks) are provided in the same number as the heating zones of the extruder.

The inputs of the thyristor-type active networks are matched by the trimming resistor $R_{Tr}$ to the output circuit of the electronic servocontroller. The input of the a.c. active network is a fixed resistance as seen from the electronic controller and an adjustable voltage divider as seen from the output stage.

The output stage is arranged for a single-phase circuit provided with two thyristors connected for antiparallel operation and controlled by a circuit for adjusting the conducting phase of the thyristors. The thyristors are fired from the secondary windings of the firing transformer. This arrangement ensures a continuous control of the heating current. An optimization of the control system is facilitated by the use of limiting relays, which automatically interrupt the heating current in response to an excessively high temperature due to a wrong setting of the potentiometers. This feature will also ensure maximum protection of the heating ribbons.

Each heating zone is provided with two limiting relays; the first for de-energization in response to an excessively high temperature and the second for initiating the operation of the drive means for the extruder.

The two limiting relays are connected to a double resistance thermometer, which measures the temperature in the respective zone.

In the conventional methods of controlling the temperature in the extruder, each heating zone was controlled by a separate controller in response to the wall temperature in the zone and independently of other zones. The known control systems cannot satisfactorily compensate the temperature variations which are due to inevitable variations in the feed rate of the plastic material as well as to changes in the speed of the screw. It has surprisingly been found that the system according to the invention results in a much better automatic control of temperature (FIG. 3), because the actual temperature of the molten material is utilized in a servocontroller to control thyristor-type active networks associated with respective heating zones. The automatic control is continuous, does not involve an operation of contacts, and is not liable to be disturbed. The electric power supplied to each zone is selected to meet the heat requirement and in most cases is less than the electric power rating so that the life of the heating elements is increased. The temperature curves measured at the extruder shell in the several heating zones and represented in FIG. 3 indicate that the shell temperatures give only a fairly inaccurate indication of the actual temperatures of the molten material.

What is claimed is:

1. Automatic temperature control system for polytropic extruders having a plurality of heating zones differing in heat requirement, said control system comprising
   a. electronic controller means adapted to control the electric heating power supplied to each of said heating zones;
   b. temperature sensing means extending into molten material at the extruder head and adapted to supply a signal representing the temperature of the molten material at the extruder head; and c. a plurality of thyristor-type active network means associated with each of said respective heating zones, each of said network means being in communication with said controller means and being adapted to regulate the electric heating power supplied to each heating zone in a pre-set, adjusted ratio, said controller means being adapted to compare the temperature sensed by said temperature sensing means and in response to that comparison is adapted to supply an output current to said thyristor-type active network means.

2. Temperature control system of claim 1 wherein the thyristor-type active network means are pre-set by manually adjustable potentiometers.

3. Temperature control system of claim 1 wherein said controller means is adapted to compare the temperature sensed by means of a bridge circuit.

* * * * *